Oct. 18, 1960   R. H. LAPUYADE   2,957,117
VOLTAGE CONTROL DEVICE FOR STORAGE CELLS OR THE LIKE
Filed Nov. 9, 1955   2 Sheets-Sheet 1

INVENTOR
Robert Henri Lapuyade
BY
Kenyon & Kenyon
ATTORNEYS

Oct. 18, 1960 R. H. LAPUYADE 2,957,117
VOLTAGE CONTROL DEVICE FOR STORAGE CELLS OR THE LIKE
Filed Nov. 9, 1955 2 Sheets-Sheet 2

INVENTOR
Robert Henri Lapuyade
BY
Kenyon & Kenyon
ATTORNEYS

United States Patent Office 2,957,117
Patented Oct. 18, 1960

2,957,117

VOLTAGE CONTROL DEVICE FOR STORAGE CELLS OR THE LIKE

Robert Henri Lapuyade, Paris, France, assignor to Societe des Accumulateurs Fixes et de Traction (Societe Anonyme), Romainville, France, a French company Filed Nov. 9, 1955, Ser. No. 545,942

Claims priority, application France June 29, 1955

13 Claims. (Cl. 320—35)

The present invention relates to voltage control devices particularly suited to the charging of sealed storage batteries.

Voltage regulators usually associated with direct current generators or with alternators, and particularly those used for charging storage batteries, and devices called voltage relays, are usually electromagnetically actuated appliances, the accuracy of which depends upon the retracting spring which is opposed to the driving electromagnet; the mechanical adjustment of the apparatus, particularly the air gaps of the magnetic pieces, the dimensions of which vary with the wear of contacts; and the variations of resistivity of the windings as a function of the temperature. Due to these several factors the said appliances are not very accurate and vary with the time.

Objects and features of the present invention are the provision of an effective voltage control device that will be accurate and free of the disadvantages just described and which will be comparatively simple and inexpensive to install and use.

A further object of the invention is to provide a voltage control device which will vary the voltage of the charge current in accordance with the varying requirements of the battery to be charged as they vary owing to the changes in the thermal conditions of the battery to be charged.

The present invention contemplates a control device in which the voltage to be regulated is compared to a standard voltage. A characteristic feature of this invention is that the standard voltage is derived from an electrolytic cell so adapted that it provides a constant and unvarying voltage at its terminals, even when the current which flows through it varies over a large range of intensity, provision being made for acting upon the generator voltage in a way depending upon the algebraic difference between the said electrolytic cell voltage and the generator voltage.

Alkaline accumulators wherein no electrolyte is consumed during use, are already known, said accumulators either being or not being enclosed in a sealed casing. A cell built up as such an accumulator, the plates of which are or are not made of sintered metal, and provided or not with active material, may be advantageously used to supply the standard voltage in the device according to the invention. Such cells, for example, are exemplified in the structure disclosed in Jeannin Patent 2,646,455, granted July 21, 1953.

The electrical characteristics of such a cell offer all the required qualifications for the system contemplated by this invention, namely, a stable and practically constant charging voltage save for variations caused by temperature changes in accordance with the further advantage described below, even when the intensity of the current varies over a rather large range. Moreover, its electrical ruggedness and complete tightness guarantee practically unchanged characteristics at any time.

More generally, in practicing the invention any type of storage cell operated on the same principle and providing the same advantages may be used to supply the standard voltage if precautions are taken to maintain the electrolyte at a constant level, e.g., by providing a feed tank filled with electrolyte and communicating with the cell in a manner which is controlled by the electrolyte level in the cell.

A special advantage of the electrolytic cell of the Jeannin type, however, is that its voltage varies as a function of the temperature in the same way as the voltage of the battery to be charged, so that the effect of temperature changes during the charging of the battery is overcome without requiring the use of compensation devices often provided in other voltage control systems.

To make use of this effect it is advantageous to put the electrolytic cell in close vicinity to the battery so that the thermal conditions of both are the same. An advantageous way of realizing this is to put the cell between two adjacent battery casings or even in one of the battery casings of the battery being charged.

If an electrolytic cell built like a storage cell is used, it is better to use a cell with a low capacity so that it may be quickly charged and stabilized.

The power obtained by opposing the battery voltage to the standard voltage of the cell being generally very low compared to the power to be controlled in the charging circuit, it is necessary to provide the cell with an amplifier as will be described.

If the charging current is obtained by rectifying an alternating current, a conventional amplifier of the electromagnetic type may be advantageously used, said amplifier comprising windings with a magnetic core and in which core a flux varying as a function of the difference between the standard voltage and the voltage of the battery to be charged is maintained.

An electronic amplifier operated either with thermionic tubes or transistors may be used instead of the electromagnetic amplifier.

Other features of the invention will be apparent from the following description and the accompanying drawings wherein.

Figure 1:
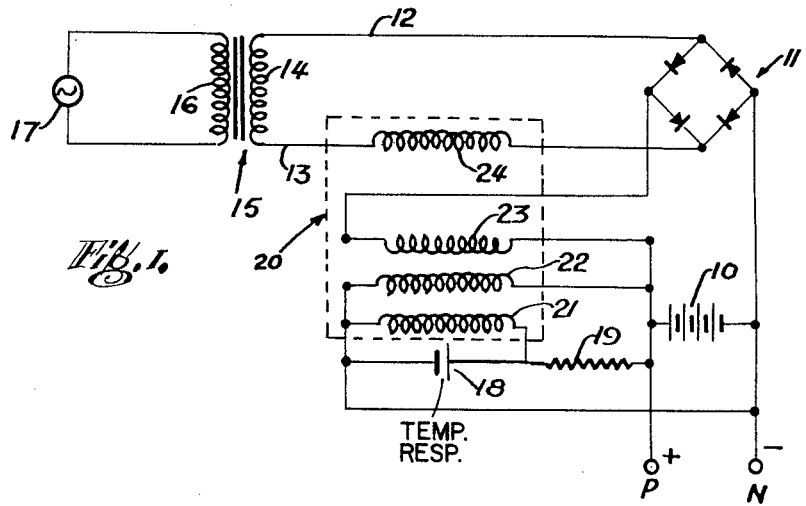
Figures 1 and 2 are circuit diagrams of two different embodiments of the invention which may be used for regulating an alternating current charging power supply.

In the embodiment depicted in Fig. 1, the charging voltage of the storage battery 10 is supplied by a rectifier 11 which is connected via wires 12 and 13 to the alternating voltage induced in the secondary winding 14 of a transformer 15, the primary winding 16 of said transformer being energized by a suitable alternating power supply, for example, the alternator 17. The storage battery 10 energizes a load circuit (not shown) which is connected to its positive and negative terminals P and N.

An electrolytic cell 18 supplying the constant standard voltage is parallelly connected to the terminals P and N of the battery 10 through a resistive element 19 so that the said cell 18 is charged by a current coming from rectifier 11 through the said resistive element 19, the latter being used to absorb the excess voltage supplied by rectifier 11. Cell 18 may be advantageously an alkaline gas-tight cell, for example, one like the cells described in said Jeannin Patent 2,646,455, comprising a positive plate (not shown) chiefly made of nickel and a negative plate (not shown) chiefly made of cadmium, each plate being pressed against the other through a thin permeable separator (not shown), the whole being impregnated with a potassium hydroxide solution and being enclosed in a tight casing (not shown). Such a cell 18 gives a constant voltage over a wide range of current intensity.

A magnetic amplifier denoted generally by the reference character 20 is utilized in the circuit. This amplifier 20 has conventional construction. The magnetic amplifier 20 has a common magnetic core or circuit bearing a winding 21 connected in parallel across the terminals of cell 18, and a winding 22 connected in parallel across the positive and negative terminals P and N of battery 10 and wound in such a way as to oppose its flux to the flux of winding 21, the turn ratio of these two windings 21 and 22 being such that no resulting flux is produced by both windings in the magnetic circuit of the core when the voltage of battery 10 has its desired correct value. The amplifier 20 also has a winding 23 which supplies excitation for its core. This winding 23 is such that the flux it induces in the magnetic core circuit is lower than the saturation flux when the correct voltage is established at the terminals P and N of the battery 10, the said flux being of opposite direction to the one induced in the core by winding 22. The amplifier 20 also includes a winding 24 in series with the wire 13 from the transformer secondary 14 and through which the alternating current passes which is used for energizing the rectifier 11. This winding 24 impedes the flow of said current with an impedance that varies as a function of the magnetic core circuit excitation of the amplifier.

The system operates in the following way: If the voltage at the battery terminals P and N increases from the desired correct value, the current passing through the winding 22 increases too and the flux generated thereby and opposed to the flux that winding 21 induces in the magnetic circuit rises. At the same time the flux which was induced in the magnetic circuit by winding 23 alone when the battery voltage was correct, therefore decreases. These resulting flux changes increase the impedance of winding 24, thus decreasing the voltage supplied to rectifier 11. The current output of the rectifier 11 then decreases, thus tending to bring the battery voltage back to the said correct value. Inverted occurrences are produced if, instead, the voltage at the battery terminals decreases.

Figure 2:
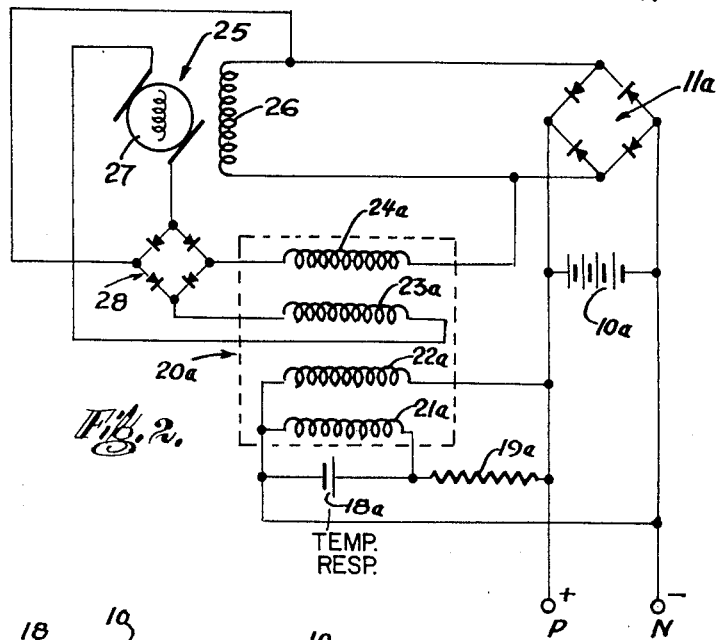

The arrangement shown in Fig. 2 is derived from that of Fig. 1, but it is adapted so as to control directly the voltage supplied by an alternator 25. This alternator 25 is depicted as being of the type comprising a fixed induced circuit 26 and a rotating inductor 27. The current energizing this inductor 27 is supplied at the terminals of the induced circuit 26 through the variable impedance winding 24a of the magnetic amplifier 20a which is similar to amplifier 20 above described. The said current is then rectified in rectifier 28. The excitation winding 23a of the magnetic amplifier 20a is included in the circuit of the direct current inductor 27. This circuit arrangement generally operates in the same way as that of Fig. 1 above, when the voltage at the terminals P and N varies.

As shown in the diagram of Fig. 2, the arrangement is adapted to be used for the charging of a storage battery 10a, the charging current of which is controlled in that way, but it could be used for other purposes. All parts therein bearing similar reference characters to those of Fig. 1 with the added suffix "a" correspond and have like functions.

If the voltage at battery terminals P and N increases from the desired correct value, the current passing through winding 22a increases too and the flux generated thereby and opposed to the flux that winding 21a induces in the magnetic circuit rises. At the same time the flux which was induced in the magnetic circuit by winding 23a alone when the battery voltage was correct, therefore decreases. These resulting flux changes increase the impedance of the winding 24a, thus decreasing the voltage supplied to the rectifier 11a. The current output of the rectifier 11a then decreases, thus tending to bring the battery voltage back to the said correct value. Inverted occurrences are produced if, instead, the voltage at the battery terminals P and N decreases.

It must be noted that when the alternator 25 is driven at a variable speed (in motor car equipment for instance) it is automatically regulated, due to the fact that, if the driving speed of the alternator increases, the frequency and voltage of the alternator increase in the same proportions. The impedance of an inductance coil is proportional to the frequency. Therefore, the increase of impedance in winding 24a will automatically decrease the excitation current when the speed of the alternator increases. The turns in said winding 24a may be determined so that the alternator 25 will maintain substantially constant characteristics in a given range of speed without needing other kinds of regulation.

Figure 3:
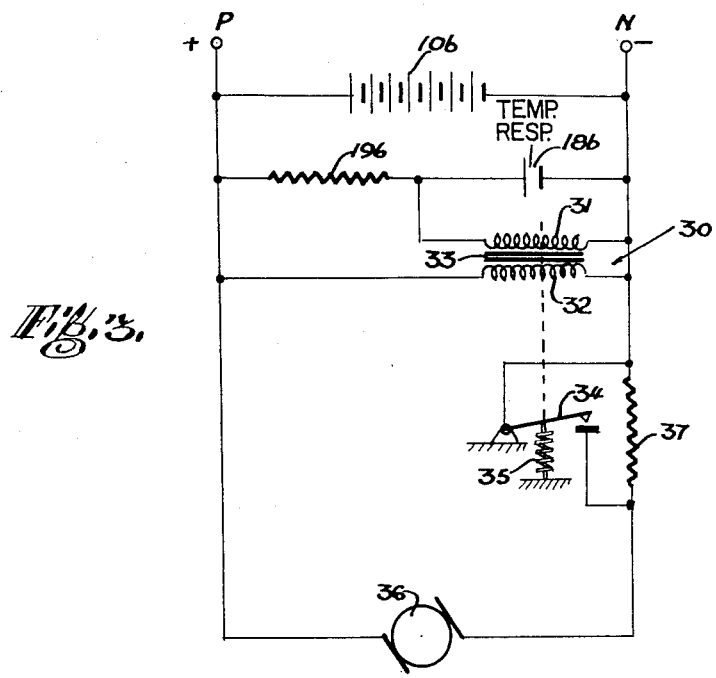
Figure 3 is a circuit diagram of another embodiment utilizing a voltage relay.

Figure 3 shows a circuit diagram of an embodiment of the invention used with a differential voltage relay 30. This relay 30 comprises windings 31 and 32 wound in opposite ways on a magnetic core 33. The resulting flux induced by these windings in the core 33 acts upon an armature (not shown), which armature is in operative connection with an interruptor 34, said interruptor 34 being reversely activated by a retractive spring 35. The interruptor normally is in circuit closed condition when relay 30 is inactivated or flux conditions in its core are as will be described. The controlled voltage supplied by the direct current generator 36 used for charging storage battery 10b is applied to the relay winding 32 through resistor 37. The said voltage is applied to the standard electrolytic cell 18b, as well, through the series resistance 19b. The potential of the said cell 18b is applied to the winding 31. Windings 31 and 32 are such that the resulting flux in their common magnetic circuit is non-existent when the voltage of the generator 36 is correct. The effect of spring 35 is then preponderant and the spring closes interruptor 34. This shunts resistor 37 out of the circuit of generator 36. If the voltage at the battery terminals increases, the flux induced by winding 32 which correlatively increases overbalances the oppositely directed flux caused by winding 31. This causes the interruptor 34 to open by appropriate operation of the relay armature in opposition to spring 35. In this way resistor 37 is again put in the circuit and the current supplied to the battery 10b decreases, thus decreasing the battery charging voltage.

By a well considered choice of the relay responsiveness and of the responsiveness of windings 31 and 32, the relay 33 operates when the controlled voltage of the circuit increases by a quantity ΔU chosen at a relatively low value as compared with U $$\left(\text{for instance } \Delta U = \frac{5}{100}U\right)$$

The operating voltage of the relay 33 to open its interruptor 34 is therefore U+ΔU. The essential feature of the above-described device is that it is practically unaffected by a disadjustment (which could be of a mechanical order) of the relay 33 itself. If the relay errs by 10% it means that ΔU will vary by 10%. If $$\Delta U = \frac{5}{100}U$$

the result of this disadjustment on the operating voltage will only be:

$$10\% \times \frac{\Delta U}{U + \Delta U} = 0.476\%$$

Practically the accuracy of the relay 33 will, therefore, be that of the standard electrolytic cell voltage.

Another advantage of the arrangement of Fig. 3 is that substantially it will be unaffected by variations of the resistivity of the relay windings due to changes in temperature, these variations usually occasioning disadjustment of the apparatus.

Figure 4:
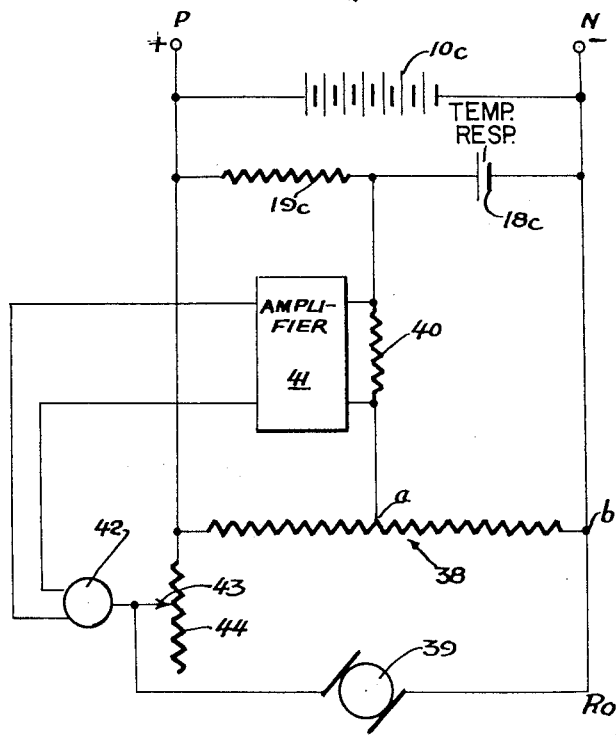
Figure 4 is a circuit which shows another embodiment using an electronic amplifier.

In the embodiment of this invention shown in the circuit diagram of Fig. 4, the standard voltage supplied at the terminals of the electrolytic cell 18c is opposed to the voltage created between points a and b of a resistor 38, the ends of said resistor 38 being connected to the output terminals of the D.C. generator 39, said resistor 38 and points a and b being chosen so that the voltage between points a and b will be equal and of a different sign to the standard voltage of electrolytic cell 18c when the voltage at the terminals P and N of battery 10c has the correct value. There is then no current in bridging resistance 40 which connects point a to the corresponding terminal of cell 18c. On the contrary, a current will flow through the resistive element 40 if the battery (10c) voltage becomes higher or lower than the correct value. The intensity of the said current (flowing in element 40) depends upon the difference between the actual battery voltage and the correct one, and its direction depends upon the sign of this difference. The voltage then appearing at the terminals of the resistor 40, as a result of current flow therein, is applied to the entrance terminals of either a transistor or a thermionic type of electronic amplifier 41 whose output supplies current in proper direction to operate a motor 42 and drive it in one or the other direction depending upon the direction of current supplied by the amplifier to operate the courser 43 of a variable resistor 44 in appropriate direction and in series with one of the terminals of the generator 39 so that the battery voltage is brought back to its correct value.

Figure 5:
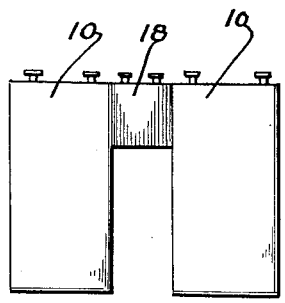
Figures 5 and 6 are diagrammatic views of two alternative ways of maintaining like thermal conditions in the cell and battery.
Figure 6:
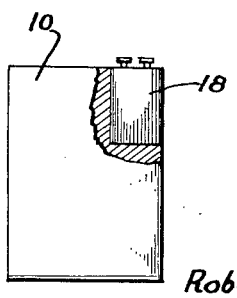

In order to subject the electrolytic cells 18, 18a, 18b or 18c to similar temperature conditions prevailing at the batteries 10, 10a, 10b, or 10c, as the case may be, any one of said cells 18a–18c, inclusive, as illustrated in Fig. 5 may be conveniently located between casings of any two adjacent batteries 10 to 10c, inclusive, or as illustrated in Fig. 6, it may be located within one of the casings of such a battery 10. With either arrangement thermal conditions of battery and of cell will then always be approximately the same.

It is to be noted that a common feature of all embodiments is that the means to control the voltage from the power supply for charging purposes is responsive to changes in circuit conditions that are a proportional function of the difference between the substantially constant voltage at the terminals of the electrolytic cell and the voltage delivered to the terminals of the battery by the power supply. In the case of Figs. 1 and 2 the occurrences of proportional differences changes the impedances of coils 24 and 24a of magnetic amplifiers 20 and 20a and, in consequence, the charging voltage supplied by rectifiers 11 or 11a. In the case of Fig. 3, occurrences of proportional differences activate relay 33 so as to cut resistor 37 in and out of the circuit from the D.C. generator 36 supplying voltage for charging battery 10b. In the case of Fig. 4, occurrences of proportional differences affects flow of current in the bridging resistor 40 and consequent regulatory operation of the courser 43 of resistor 44 in the charging circuit from generator 39 to the battery 10c.

While specific embodiments of the invention have been shown and described variations in detail within the scope of the appended claims are possible and are contemplated. There is no intention, therefore, of limitation to the exact details shown and described.

What is claimed is:

1. A battery charging system comprising an electrical charging source, a rechargeable sealed cell having a substantially constant voltage connected to be charged from said source and positioned with respect to a sealed battery to be charged so that thermal conditions of both are substantially the same, said cell having a voltage varying substantially only as a function of its thermal condition, said variations being substantially similar to the voltage variations of said battery caused by the thermal conditions of said battery, an electric circuit interconnecting the cell, the battery terminals and the source, and control means in said circuit responsive to a proportional function of the difference between said cell voltage and the voltage delivered by said source to maintain the voltage at the battery terminals at a correct selected value.

2. The system of claim 1 wherein said cell is a rechargeable gas-tight alkaline electrolytic cell.

3. A battery charging control system comprising an electrical charging source, a battery to be charged, a rechargeable cell connected to be charged from said source and having a substantially constant voltage and being positioned with respect to said battery to be charged so that thermal conditions of the cell and battery are substantially the same, the cell having a voltage varying only substantially as a function of its thermal conditions, such variations being substantially like the voltage variation function of said battery caused by thermal conditions of said battery, said control means including an electromagnetic winding connected to the terminals of said cell and a second electromagnetic winding connected with the terminals of said source, said windings being so arranged that the fluxes generated thereby balance each other when the voltage of the source has its correct selected value.

4. The system of claim 1 wherein said source is a controlled alternating current generator and said circuit includes an electromagnetic amplifier, said amplifier comprising a winding connected to the terminals of said cell, a second winding connected with the terminals of said battery, said windings being so arranged that the fluxes generated thereby balance each other when the voltage at the battery has its correct selected value, a third winding on said amplifier energized by said generator and a fourth winding on said amplifier connected in the alternating current circuit of said generator and providing a variable impedance therein.

5. The system of claim 1 wherein said control means includes a resistor in said circuit and a normally open voltage relay for bringing said resistor into and out of said circuit, said relay including a winding connected to the terminals of said cell and a second winding connected to the terminals of the battery, said windings being so arranged that the fluxes generated thereby balance each other when the voltage at the terminals of the battery has its correct selected value.

6. The system of claim 1 wherein said control means includes a resistor in said circuit and a normally open voltage relay for bringing said resistor in and out of said circuit, said relay including a pair of windings connected in said circuit to provide opposing fluxes which are balanced when the voltage at the terminals of said battery has its correct selected value, and a spring actuated circuit closer connected across said resistor and whose spring operates the closer to circuit closing condition thus shunting out said resistor when the fluxes are in balance.

7. The system of claim 1 wherein said control means includes a resistor connected in said circuit through which current flows only when the voltage at the terminals of said battery departs from its correctly selected value and an electronic amplifier to whose input terminals said resistor is connected, a variable resistor in said circuit for controlling voltage from said source, and means operated by the output from said amplifier to adjust said variable resistor so as to restore said selected value.

8. The system of claim 1 wherein said control means includes an electronic amplifier to whose input said cell and said source are connected so as to supply opposed currents.

9. A voltage control system comprising an A.C. source of electric power, a rectifier connected to said source, a resistor, a sealed battery, a rechargeable sealed electrolytic cell connected to be recharged from said source and being positioned with respect to said battery so that the thermal conditions of both are the same, said cell having a voltage varying only substantially as a function of its thermal condition, such variation being substantially like the voltage variation function of said battery caused by thermal conditions of said battery, and an electromagnetic amplifier having a plurality of windings one of which is interposed between the rectifier and the source, said electrolytic cell being connected in series with said resistor and in parallel therewith across the terminals of said battery, a second of said windings being connected in parallel with said cell, a third of said windings being connected in parallel with the terminals of said battery to oppose the flux created by said second named winding and a fourth of said windings being connected between one rectifier output terminal and the positive terminal of said battery so that amplifier flux is generated by said fourth winding in opposition to that of said third winding, whereby any departure from a correct selected voltage established at the terminals of the battery will cause a change in net flux generated in the magnetic circuit of the amplifier and a consequent change in impedance of the first named winding with corresponding change in voltage supplied to said rectifier by said power supply resulting in a tendency toward restoration to said correct voltage value at the battery terminals as modified only by changes in the thermal conditions of the said storage battery from the thermal conditions under which said correct voltage was selected.

10. A system for charging a storage battery comprising a storage battery to be charged, a source of charging current, a rechargeable gas tight electrolytic cell connected to be charged from said source and having substantially constant voltage and being positioned relative to the battery to be charged so that thermal conditions of both are substantially the same, the voltage of said cell varying only as a function of its thermal condition, such function being substantially the same as the thermal voltage variation function of said battery, a resistor connected in series with the positive terminal of said cell and the positive terminal of said battery and the negative terminal of said cell being connected to the negative terminal of said battery, an electric circuit interconnecting the source of charging current and the terminals of said battery and control means in said circuit responsive to a proportional function of the difference between said constant cell voltage and the voltage appearing at any time at said battery terminals to regulate voltage from the charging source so as to maintain the voltage at the battery terminals at a correct selected value as modified only by changes in the thermal conditions of the said storage battery from the thermal conditions under which said correct voltage was selected.

11. A system for charging a storage battery comprising a storage battery to be charged, a source of charging current, a rechargeable, substantially gas tight electrolytic cell connected to be charged from said source and having substantially constant voltage and being maintained in contact with the battery to be charged so that thermal conditions of both are substantially the same, the voltage of said cell varying only as a function of its thermal condition, such function being substantially the same as the thermal voltage variation function of said battery, the negative terminals of said battery and cell being directly connected, and a resistor connected between the positive terminals of the battery and cell, an electric circuit interconnecting said source and the terminals of said battery, a voltage regulating resistor in said circuit and control means for the latter resistor connected to the cell terminals and to the battery terminals and operatively responsive to a proportional function of the difference between the constant voltage of said cell and the voltage appearing at any time at said battery terminals to cause said voltage regulating resistor to function in said circuit so as to maintain the voltage from said charging source always at a correct selected value at said battery terminals.

12. A system for charging a storage battery comprising a storage battery to be charged, an electrical charging source, a rechargeable, substantially gas tight electrolytic cell connected to be charged by said source and having substantially constant voltage positioned in contact with the battery to be charged so that thermal conditions of both are substantially the same, the voltage of said cell varying only as a function of its thermal condition, such function being substantially the same as the thermal voltage variation function of said battery, the negative terminals of said battery and cell being connected and a resistor connecting the positive terminals of said battery and said cell, an electric circuit interconnecting said source and the terminals of said battery, a variable resistor in said circuit for controlling the voltage and charging current delivered to said battery from said source, a resistor connected in parallel with the battery terminals and having an intermediate terminal, a bridging resistor connecting said intermediate terminal with the positive terminal of said cell, said intermediate terminal being so located that when voltage at the battery terminals is at a correct selected value no current flows through said bridging resistor, an electronic amplifier having its input terminals connected across said bridging resistor and responsive to current flow therethrough and means operated by the output of said amplifier when such current flows for adjusting said variable resistor to regulate the voltage from the charging source so as to restore said correct selected value of voltage at the battery terminals and thereby also eliminate current flow in said bridging resistor.

13. A system for charging a storage battery comprising an electrical charging source, a battery to be charged from said source, a rechargeable cell also to be charged from said source and having a substantially constant voltage, the voltage of said cell varying only as a function of its thermal condition, such function being substantially the same as the thermal voltage variation function of said battery, said cell being positioned in contact with the battery to be charged so that thermal conditions of both are substantially the same, a resistor connected in series with said cell, said serially connected resistor and cell being connected in parallel with the terminals of said battery, a circuit connecting said source to said battery terminals so that both the battery and said cell are charged from said source, a variable resistor in said circuit for controlling the voltage delivered from said source to said battery terminals, a resistor connected in parallel with said battery terminals, a bridging resistor connected between an intermediate point of said last named resistor and the connecting junction between said cell and said first named resistor, current flowing in said bridging resistor only when the voltage at said battery terminals departs from a selected value, an amplifier whose input terminals are connected to said bridging resistor so that any current flowing in said bridging resistor as a result of departure of battery terminal voltage from said selected value provides corresponding amplified output at the output terminals of said amplifier, and means operated by said amplified output to adjust said variable resistor and restore the voltage at said battery terminals to its selected value.

References Cited in the file of this patent

UNITED STATES PATENTS

| | | |
|---|---|---|
| 1,533,906 | Threm | Apr. 14, 1925 |
| 1,843,250 | Spencer | Feb. 2, 1932 |
| 1,970,329 | Marrison | Aug. 14, 1934 |
| 2,239,768 | Artzt | Apr. 29, 1941 |
| 2,423,134 | Winkler | July 1, 1947 |
| 2,465,277 | Schafer | Mar. 22, 1949 |
| 2,646,455 | Jeannin | July 1, 1953 |
| 2,666,883 | Guelpa | Jan. 19, 1954 |
| 2,769,134 | Hookam | Oct. 30, 1956 |

FOREIGN PATENTS

| | | |
|---|---|---|
| 474,398 | Great Britain | Nov. 1, 1937 |